United States Patent
Adapala et al.

(10) Patent No.: US 11,928,728 B1
(45) Date of Patent: *Mar. 12, 2024

(54) SYSTEMS AND METHODS FOR TRACKABLE TRANSACTION REQUESTS

(71) Applicant: Wells Fargo Bank, N.A., San Francisco, CA (US)

(72) Inventors: Naga Adapala, Pleasanton, CA (US); Kristin K. Koppelman, Bloomington, MN (US); Carine P. Gursky, San Francisco, CA (US); Gregg R. Napoli, San Francisco, CA (US); Sushil Kumar Vyas, Waxhaw, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,920

(22) Filed: Sep. 6, 2022

Related U.S. Application Data (63) Continuation of application No. 15/384,925, filed on Dec. 20, 2016, now Pat. No. 11,526,933.
(Continued)

(51) Int. Cl.
G06Q 40/02 (2023.01)
G06Q 20/02 (2012.01)
G06Q 20/10 (2012.01)

(52) U.S. Cl.
CPC ........... *G06Q 40/02* (2013.01); *G06Q 20/027* (2013.01); *G06Q 20/108* (2013.01)

(58) Field of Classification Search
None
See application file for complete search history.

(56) References Cited

U.S. PATENT DOCUMENTS

| | | | |
|---|---|---|---|
| 7,021,528 B2 * | 4/2006 | Igval | G06Q 20/042 235/379 |
| 7,925,586 B2 * | 4/2011 | Cole | G06Q 20/102 705/40 |

(Continued)

FOREIGN PATENT DOCUMENTS

| | | |
|---|---|---|
| CN | 101241583 A * | 8/2008 |
| EP | 1 139 264 A2 | 10/2001 |

(Continued)

OTHER PUBLICATIONS

CN 101241583A Machine Translation (Year: 2008).*
(Continued)

*Primary Examiner* — Paul S Schwarzenberg
(74) *Attorney, Agent, or Firm* — Foley & Lardner LLP (57) ABSTRACT

A provider institution computing system includes a customer database storing customer information, a network interface circuit structured to enable an exchange of information over a network, and a transaction circuit generating trackable transaction requests. The transaction circuit is structured to: receive information including a transaction type and destination account information; generate a transaction request including at least one tracking instruction and a transaction identification code associated with the transaction request; transmit the transaction request to a correspondent institution; generate a graphical user interface that includes a list of transaction requests that have transaction identification codes associated with the customer, the list including tracking information, the transaction identification code, and information regarding an estimated date that the first transaction request will be settled; provide the graphical user interface to a customer device; provide information regarding a travel history of the transaction request; and settle the transaction request.

11 Claims, 5 Drawing Sheets

Related U.S. Application Data (60) Provisional application No. 62/271,790, filed on Dec. 28, 2015.

(56) References Cited

U.S. PATENT DOCUMENTS

| | | | |
|---|---|---|---|
| 9,043,246 B2 | 5/2015 | Serebrennikov | |
| 10,062,108 B2 | 8/2018 | Mulhim | |
| 10,078,863 B2 | 9/2018 | Loganathan | |
| 10,083,482 B2 | 9/2018 | Mehew et al. | |
| 10,163,083 B2 * | 12/2018 | Guido | G06Q 20/108 |
| 10,212,157 B2 | 2/2019 | Dolan et al. | |
| 10,296,875 B1 | 5/2019 | Prasad et al. | |
| 10,339,608 B1 | 7/2019 | Haitz et al. | |
| 10,380,583 B1 | 8/2019 | Ellis et al. | |
| 10,535,045 B2 | 1/2020 | Meszaros et al. | |
| 10,564,796 B2 | 2/2020 | Friedman et al. | |
| 10,956,244 B1 | 3/2021 | Cho | |
| 11,017,347 B1 | 5/2021 | Choudhury et al. | |
| 2003/0208440 A1 * | 11/2003 | Harada | G06Q 20/10 705/39 |
| 2004/0199463 A1 * | 10/2004 | Deggendorf | G06Q 20/10 705/39 |
| 2005/0171811 A1 * | 8/2005 | Campbell | G06Q 40/02 705/35 |
| 2006/0277143 A1 * | 12/2006 | Almonte | G06Q 20/10 705/39 |
| 2008/0015985 A1 * | 1/2008 | Abhari | G06Q 20/10 705/42 |
| 2011/0093324 A1 * | 4/2011 | Fordyce, III | G06Q 30/0226 705/14.27 |
| 2013/0325604 A1 * | 12/2013 | Yeri | G06Q 30/0215 705/14.53 |
| 2014/0118829 A1 | 5/2014 | Ma et al. | |
| 2015/0051894 A1 | 2/2015 | Shokooh et al. | |
| 2016/0217399 A1 | 7/2016 | Roelofs et al. | |
| 2017/0364920 A1 | 12/2017 | Anand | |
| 2019/0377417 A1 | 12/2019 | Friedman et al. | |
| 2019/0378182 A1 | 12/2019 | Weinflash et al. | |

FOREIGN PATENT DOCUMENTS

| | | | | |
|---|---|---|---|---|
| EP | 1139264 A2 * | 10/2001 | | G06Q 10/087 |
| WO | WO-2010/093931 A1 | 2/2010 | | |
| WO | WO-2010093931 A1 * | 8/2010 | | G06Q 20/023 |

OTHER PUBLICATIONS

Duarte, "Blockchain Technologies Applied to Interbank Transfers," (Jul. 2019), University of Portugal, (https://repositorio-alberto.up.pt/bitstream/10216/122814/2/358238.pdf).

Team Truly, "Wire Transfers Explained: 10 Things You Absolutely Need to Know," (Feb. 23, 2022), Truly Financial, Blog (https://trulyfinancial.com/blog/wire-transfers-explained/).

* cited by examiner

SYSTEMS AND METHODS FOR TRACKABLE TRANSACTION REQUESTS

CROSS-REFERENCE TO RELATED PATENT APPLICATIONS

This application is a continuation of U.S. patent application Ser. No. 15/384,925, filed Dec. 20, 2016, which claims the benefit of U.S. Provisional Application No. 62/271,790, filed Dec. 28, 2015, both of which are incorporated herein by reference in their entireties.

BACKGROUND

Financial transactions and exchanges often involve multiple entities. A customer may originate a transaction request at a first bank, which may subsequently be routed through multiple banks and financial networks before being received at the bank where a beneficiary account is maintained. Along the way, the transaction request may be subject to various messaging, formatting, and data exchange protocols, which may in turn involve distinct transaction identifiers, codes, and other types of information that may be specific to various financial institutions and networks. In addition, as the transaction request travels from institution to institution, the transaction request may be subject to various compliance reviews, automated or manual approvals, and so on. As a result, the transaction request may take an extended period of time, and run into denials or delays. Further, changes across messaging protocols may inhibit attempts to track or otherwise determine the status and location of the transaction request.

SUMMARY

One example embodiment relates to a financial institution computing system. The financial institution computing system includes a customer database, a network interface circuit, and a transaction circuit. The customer database is structured to retrievably store financial information relating to a customer and tracking information relating to a plurality of transaction requests. The network interface circuit is structured to enable the financial institution computing system to exchange information over a network. The transaction circuit generates trackable transaction requests across a plurality of financial institutions. The transaction circuit is structured to receive financial information including at least a transaction type and beneficiary account information from an originator computing system over the network. The transaction circuit is further structured to generate a transaction request corresponding to the financial information and including a transaction identification code. The transaction circuit is structured to transmit the transaction request to a correspondent institution over the network via the network interface circuit. The transaction circuit is further structured to receive tracking information from at least one correspondent institution over the network via the network interface circuit. The transaction circuit is structured to provide the tracking information to the originator computing system and settle the transaction request.

Another example embodiment relates to a method of generating trackable transaction requests as performed by one or more circuits at a financial institution computing system. The method includes receiving financial information including at least a transaction type and beneficiary account information from an originator computing system over a network. The method further includes generating a transaction request corresponding to the financial information and including a transaction identification code. The method includes transmitting the transaction request to a correspondent institution over the network via a network interface circuit. The method further includes receiving tracking information from at least one correspondent institution over the network via the network interface circuit. The method includes providing the tracking information to the originator computing system. The method further includes settling the transaction request.

Yet another example embodiment relates to a non-transitory computer readable media having computer-executable instructions embodied therein that, when executed by a processor of a financial institution computing system, cause the financial institution computing system to perform operations to generate trackable transaction requests. The operations include receiving financial information including at least a transaction type and beneficiary account information from an originator computing system over a network. The operations further include generating a transaction request corresponding to the financial information and including a transaction identification code. The operations include transmitting the transaction request to a correspondent institution over the network via a network interface circuit. The operations further include receiving tracking information from at least one correspondent institution over the network via the network interface circuit. The operations include providing the tracking information to the originator computing system. The operations further include settling the transaction request.

DETAILED DESCRIPTION

Figure 1:
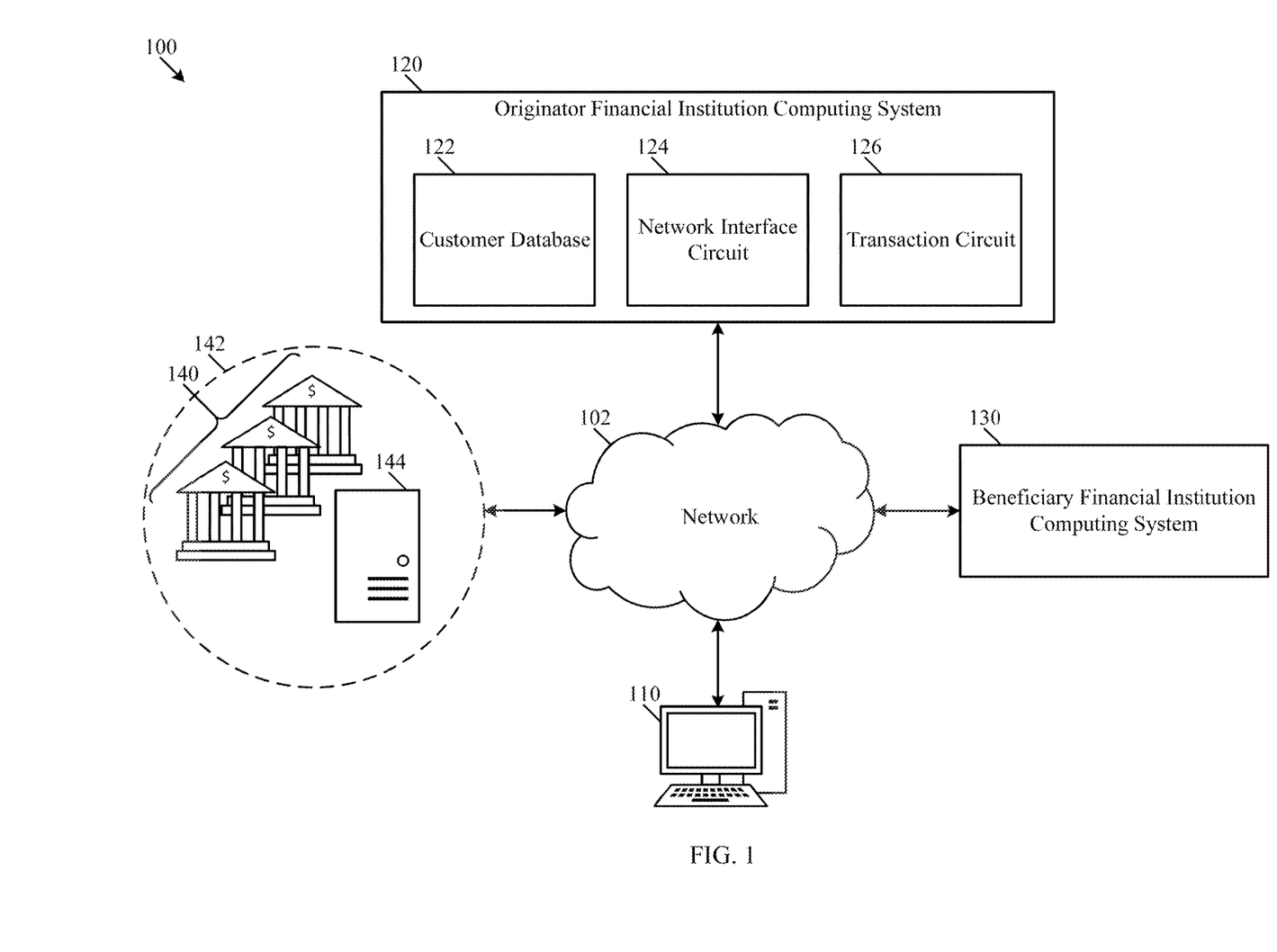
FIG. 1 is a block diagram illustrating a transaction system, according to an example embodiment.

Referring to FIG. 1, a system 100 provides tracking capabilities for parties to a financial transaction. The system 100 includes a network 102, an originator computing system 110, an originator financial institution computing system 120, a beneficiary financial institution computing system 130, and correspondent institutions 140. As discussed in more detail below, the system 100 enables real time or otherwise updated transaction tracking functionalities to various parties involved in a financial transaction.

The network 102 allows the computing systems of the system 100 to exchange data with one another. The network 102 is a data exchange medium, and may include one or more wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 102 includes the internet.

The originator computing system 110 is a computing system associated with a customer of the financial institution corresponding to the originator financial institution computing system 120. The originator computing system 110 is configured to execute software programs (e.g., internet browsers), access websites, generate graphical user interfaces, receive various inputs, generate various outputs, and perform other similar operations. The originator computing system 110 further include hardware and associated logic to provide input functionalities (e.g., keyboards, microphones, pointing devices, etc.) and output functionalities (e.g., a display, speakers, indicator lights, etc.) for customer use. Examples of the originator computing system 110 include laptop computers, desktop computers, virtual desktops, smartphones, tablets, and so on. The originator computing system 110 allows the customer to interface with the originator financial institution computing system 120 and initiate and track various financial transactions that are ultimately settled at the beneficiary financial institution computing system 130.

The originator financial institution computing system 120 is a computing system at a financial institution that is capable of maintaining customer accounts, processing financial transactions, generating transaction requests, tracking transaction requests, and managing customer financial and non-financial information. In the context of the present disclosure, the originator financial institution can include commercial or private banks, credit unions, investment brokerages, and so on. The originator financial institution computing system 120 includes a customer database 122, a network interface circuit 124, and a transaction circuit 126. As discussed in more detail below, the functionalities of the components of the originator financial institution computing system 120 allows any of the originator computing system 110, the beneficiary financial institution computing system 130, and/or any of the correspondent institutions 140 to track transaction requests initiated by the customer at the originator computing system 110.

The customer database 122 is configured to retrievably store customer information relating to various operations discussed herein, and may include non-transient data storage mediums (e.g., local disc or flash-based hard drives, local network servers, and the like) or remote data storage facilities (e.g., cloud servers). The customer database 122 may include financial information (e.g., account numbers, account balances, available credit, credit history, transaction histories, and so on), non-financial information generated by the financial institution (e.g., financial institution customer names, addresses, phone numbers, and so on), and transaction tracking information (e.g., customer identification numbers, transaction identification numbers, pending and completed transaction information, etc.).

The network interface circuit 124 enables the originator financial institution computing system 120 to exchange data over the network 102. As used herein, the term "circuit" may include hardware configured to execute the functions as described. In some embodiments, each respective "circuit" may include software for configuring the hardware to execute the functions described herein. The circuit may be embodied as one or more circuitry components including, but not limited to, processing circuitry, storage media, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuit, hybrid circuit, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

A given "circuit" may also include one or more processors communicatively coupled to a memory. In this regard, the one or more processors may execute instructions stored in memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus.

Each memory device discussed herein may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Each respective memory may be operable to maintain or otherwise store information relating to the operations performed by one or more associated circuits, including processor instructions and related data (e.g., database components, object code components, script components, etc.), in accordance with the example embodiments described herein.

Based on the operations described herein with respect to each circuit, a given circuit may further be communicatively coupled to one or more other components, for example other circuits, input devices (e.g., devices providing incoming data to be processed by the circuit), output devices (e.g., devices receiving and acting upon data processed by the circuit), or intermediary devices (e.g., routing data to or from other components). In addition, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

With respect to the transaction circuit 126, the transaction circuit 126 enables various computing systems of the system 100 to track the progress of transaction requests initiated by customers of the originator financial institution. In one aspect, the transaction circuit 126 is configured to receive transaction information from a customer of the originator financial institution (e.g., via the originator computing system 110) and generate and send transaction requests. The transaction information relates to a desired financial transaction, which may identify a financial operation to be performed, as well as an originator financial account and a beneficiary financial account, as appropriate. Example transaction requests include domestic and international fund transfers (e.g., payment transactions), currency exchanges, securities transactions, derivatives transactions, and so on. The transaction information can, for example, identify a checking account associated with the customer, identify a checking account associated with a beneficiary (e.g., a merchant, family member, business partner, etc.), and request a fund transfer from the customer checking account in the United States to the beneficiary checking account in France, including a conversion from United States currency to French currency.

Upon receiving the transaction information from the customer, the transaction circuit 126 may generate a corresponding transaction request. The transaction request may include some or all of the transaction information (e.g., relevant financial accounts and a requested financial operation), in addition to one or more identification codes. The identification codes may be used by computing systems of the system 100 to identify the customer and/or the transaction request itself.

In some arrangements, the transaction circuit 126 is configured to generate a customer identification code (a "customer ID") associated with each customer of the originator financial institution. The customer ID may be generated as an alphanumeric or numeric code of sufficient length and complexity to uniquely identify a specific customer among the customers of the originator financial institution. In some arrangements, the customer ID is generated to include a segment of a code or data for a corresponding field in a transaction request as an originator financial institution identifier. The remaining portion of the customer ID may be used to identify the corresponding customer. For example, where the originator financial institution is "ABC Bank", a customer ID may be generated as "ABCB0123456". In such an example, "ABCB" may be used as the originator financial institution identifier to identify ABC Bank, and "0123456" may be used to identify the customer associated with the transaction request.

In turn, the transaction circuit 126 may generate a transaction identification code (a "transaction ID") associated with each transaction request. The transaction ID may also be an alphanumeric code or numeric code generated specifically for each transaction request produced by the transaction circuit 126. The transaction ID may also include an originator financial institution identifier. In some arrangements, each transaction ID is also associated with a customer ID of the customer originating the transaction request. As such, a transaction ID may be used to identify a specific transaction request and corresponding transaction information, and a customer ID may be used to identify a customer and all transaction requests associated with that customer. Customer IDs and transaction IDs may be stored at the customer database 122.

In another aspect, the transaction circuit 126 may be configured to track transaction requests. In some arrangements, the transaction circuit 126 receives information relating to pending transaction requests (i.e., transaction requests that have not yet been settled) over the network 102 via the network interface circuit 124. The information may be received from correspondent institutions 140, which may be provided in real time, periodically, or upon request of the transaction circuit 126. The transaction circuit 126 may further receive information from the beneficiary financial institution computing system 130, once a given transaction request has been cleared and/or settled at the beneficiary financial institution computing system 130. In some arrangements, the information transmitted by the beneficiary financial institution computing system 130 is first routed through the correspondent institutions 140, as discussed below. The transaction circuit 126 may then update the customer database 122 with the information received from the correspondent institutions over the network 102. The transaction circuit 126 may then be able to provide a requesting computing system (e.g., the originator computing system 110) with tracking information relating to a given transaction request.

In some arrangements, the transaction circuit 126 is configured to include tracking instructions in the transaction request. The tracking instructions may instruct various systems involved in a given transaction request to provide tracking information to the originator financial institution computing system 120. In some arrangements, the tracking instructions may instruct each correspondent institution to provide a tracking update to the originator financial institution computing system 120 upon clearing the transaction request. In some arrangements, the tracking instructions may instruct the correspondent institutions 140 to provide a tracking update to the originator financial institution computing system 120 at set time intervals (e.g., once a day, once every six hours, etc.). Further, in some arrangements, the tracking instructions may instruct the correspondent institutions 140 to provide the originator financial institution computing system 120 with an alert in the event the transaction request is delayed, denied, or otherwise adversely treated. In such arrangements, the transaction circuit 126 may be configured to communicate the alert to the originator computing system 110 to notify the customer accordingly.

In yet another aspect, the transaction circuit 126 may be configured to provide customers with features that are incidental to transaction requests. In one arrangement, the transaction circuit 126 is configured to maintain a rewards program for customers of the originator financial institution. The rewards program may be configured to provide an incentive for customers to originate additional transaction requests. The incentive may include, for example, awards of "points" that may be redeemed for various types of discounts, free services, cash, and so on. The transaction circuit 126 may award points to customers for originating transaction requests, which may be awarded when the transaction circuit 126 confirms that a given transaction request has been settled at the beneficiary financial institution.

In another aspect, the transaction circuit 126 may be configured to provide a graphical user interface to customers of the originator financial institution. The graphical user interface may be presented to a given customer on an output device on the originator computing system 110, for example on a display as a webpage on an internet browser or as a mobile application. The graphical user interface may be configured to allow the customer to log in and view financial account information (e.g., by providing a user name or customer ID and password, which may be stored in the customer database 122). The customer may then use the graphical user interface to provide information to generate transaction requests, track pending transaction requests, and so on.

The beneficiary financial institution computing system 130 is a computing system associated with a financial institution maintaining at least one financial account corresponding to a customer identified as a beneficiary of a transaction request. In some arrangements, the beneficiary financial institution is located within the same country as the originator financial institution. In other arrangements, each of the originator financial institution and the beneficiary financial institution are located in different countries.

The correspondent institutions 140 are entities disposed along and/or associated with a chain of communication relating to a transaction request between the originator financial institution computing system 120 and the beneficiary financial institution computing system 130. Correspondent institutions 140 may include domestic and international banks, clearing houses, financial networks, and so on. In some arrangements, the originator financial institution computing system 120 and the beneficiary financial institution computing system 130 share a business relationship such that transaction requests may be cleared and settled at the beneficiary financial institution computing system 130 without involving correspondent institutions 140. For example, where the originator financial institution maintains a financial account at the beneficiary financial institution computing system 130, the originator financial institution computing system 120 may transmit a transaction request directly to the beneficiary financial institution computing system 130 to complete a financial transaction (e.g., a fund transfer) on behalf of a customer. The beneficiary financial institution computing system 130 may debit the financial account associated with the originator financial institution and credit a financial account associated with a beneficiary accordingly.

In arrangements where the originator financial institution and the beneficiary financial institution do not share such a relationship, transaction requests may be routed through the correspondent institutions 140. For example, the originator financial institution may maintain a financial account at one of the correspondent institutions 140, and the one of the correspondent institutions 140 may maintain a financial account at the beneficiary financial institution computing system 130. As such, the originator financial institution computing system 120 may transmit a transaction request to the one of the correspondent institutions 140, which in turn may then forward a corresponding transaction request to the beneficiary financial institution computing system 130. The transaction request may be settled by adjusting bookkeeping entries at each computing system.

In some arrangements, one or more of the correspondent institutions 140, the originator financial institution, and the beneficiary financial institution is associated with a financial network 142. The financial network 142 is an organization of member and/or participant financial institutions designed to facilitate domestic and international interbank transactions. Examples of the financial network 142 include the Society for Worldwide Interbank Financial Telecommunications ("SWIFT"), the Federal Reserve Wire Network ("Fedwire"), and the Clearing House Interbank Payments System ("CHIPS"). In some arrangements, the financial network 142 is configured for transaction clearing but not settlement (e.g., the messaging system provided by SWIFT). In other arrangements, the financial network 142 is configured for both transaction clearing and settlement (e.g., Fedwire and CHIPS). A given financial institution (e.g., the originator financial institution, the beneficiary financial institution, and/or any of the correspondent institutions 140) may be a member and/or participant of one, some, none, or all of various types of financial networks. Further, in some arrangements, the correspondent institutions include financial institutions in a first financial network and financial institutions in a second financial network. As such, in some such arrangements, a given transaction request may pass through multiple correspondent institutions in multiple financial networks before being received at the beneficiary financial institution computing system 130. Consistent among these and other arrangements, transaction requests transmitted among the various financial institutions of the system 100 include identification codes (e.g., a customer ID and/or a transaction ID) generated by the transaction circuit 126.

In some arrangements, the financial network 142 operates at least in part through a financial network server 144 communicatively coupled to each of the financial institutions of the financial network 142. The financial network server 144 may be configured to manage and route transaction request traffic among the various financial institutions of the financial network 142. For example, where the financial network 142 includes Fedwire, the financial network server 144 may be operated out of one or more of the United States Federal Reserve Banks, and configured for transaction request clearing and settlement. As another example, where the financial network 142 includes SWIFT, the financial network server 144 may include one or both of the data centers in the United States and the Netherlands associated with the SWIFT network.

One or more of the correspondent institutions 140, the financial network server 144, and the beneficiary financial institution computing system 130 provides the originator financial institution computing system 120 with tracking information for one or more transaction requests generated by the transaction circuit 126. In some arrangements, an originator financial institution identifier is used to direct tracking information to the originator financial institution computing system 120. In one such arrangement, the financial network server 144 may be configured to periodically search for and transmit updated tracking information corresponding to transaction requests that include the originator financial institution identifier. In another such arrangement, the transaction circuit 126 is configured to transmit a tracking information request to the correspondent institutions 140, which in response, provide tracking information for transaction requests that include the originator financial institution identifier. The transaction circuit 126 may also request tracking information for specific transactions, for example by including a transaction ID in a tracking information request.

Figure 2:
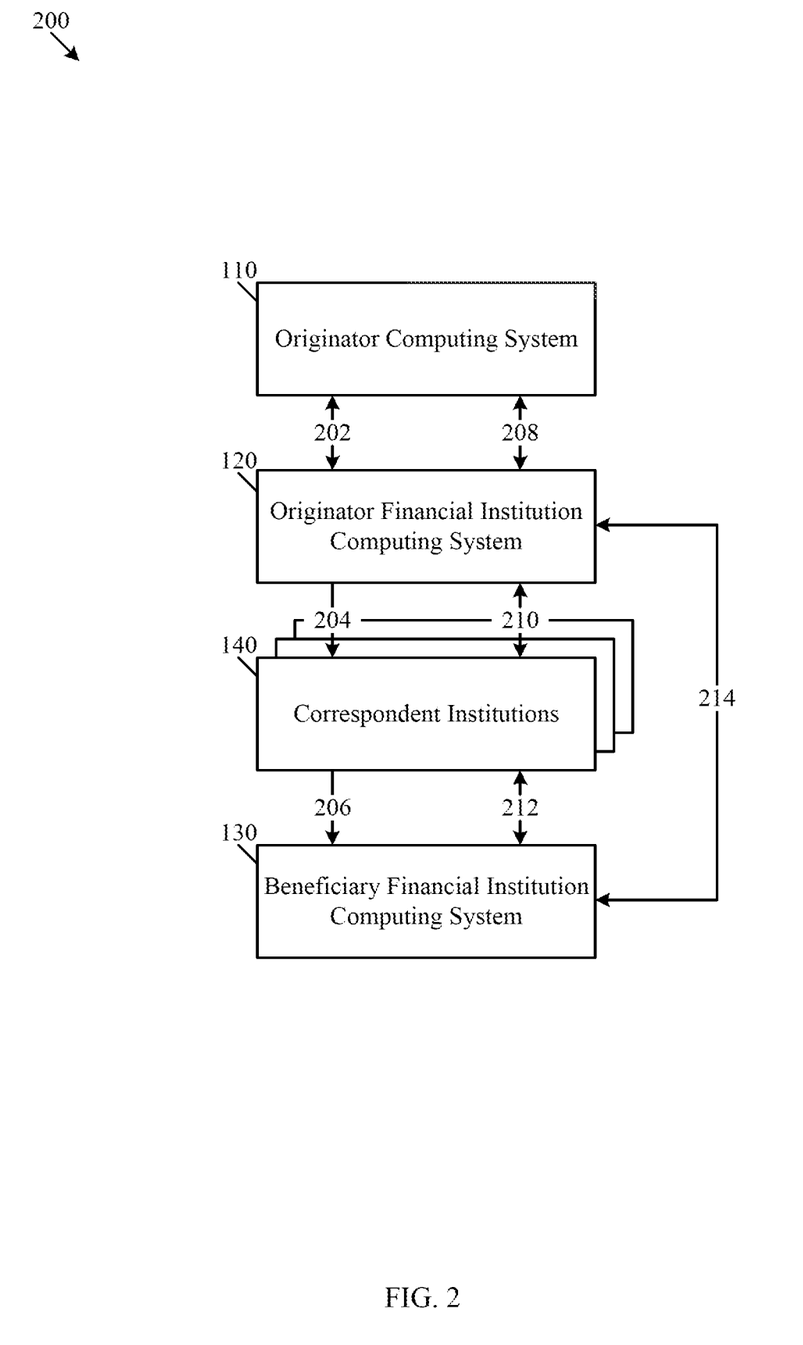
FIG. 2 is a block flow diagram of various processes involving data flows among components of the transaction system of FIG. 1.

FIG. 2 illustrates processes 200 that may be implemented by the system 100 of FIG. 1. By way of example, FIG. 2 shows example data flows from an originator financial institution computing system 120 that enables financial transactions to be tracked across multiple entities domestically and internationally.

In one example of the processes 200, a customer of the originator financial institution may use the originator computing system 110 to access a graphical user interface and provide financial information to the originator financial institution computing system 120 to generate a transaction request at 202. The originator financial institution computing system 120 generates and transmits the transaction request to correspondent institutions 140 at 204. In some arrangements, the correspondent institutions 140 are associated with one or more financial networks (e.g., the financial network 142). Further, in some arrangements, the transaction request is received and routed by a financial network server (e.g., the financial network server 144). The beneficiary financial institution computing system 130 ultimately receives the transaction request directly or indirectly from one of the correspondent institutions 140 at 206, after which the transaction request is settled.

The customer may also use the originator computing system 110 to access the graphical user interface to track one or more transaction requests at 208. While a given transaction request is pending, correspondent institutions may provide the originator financial institution computing system 120 with information relating to the status of the transaction request at 210. In some arrangements, the correspondent institutions 140 update the originator financial institution computing system 120 periodically (e.g., once a day, two times a day, once an hour, etc.). In some arrangements, the correspondent institutions 140 update the originator financial institution computing system 120 in real time (e.g., as the transaction request is received at a next correspondent institution, as the transaction request is approved at a given correspondent institution, etc.). In yet other arrangements, the correspondent institutions 140 provide updates in response to a request from the originator financial institution computing system 120, which may also be routed through one or more correspondent institutions 140. At 212, the beneficiary financial institution computing system 212 may transmit a confirmation that the transaction request has been cleared and settled to the originator financial institution computing system 120 via the correspondent institutions 140. The originator financial institution computing system 120 may collect and organize the updates and confirmations received from the correspondent institutions 140, and provide corresponding tracking information to the originator computing system 110 at 208. In addition, the originator financial institution computing system 120 may maintain a rewards program associated with generated, pending, and completed transaction requests, and provide information relating to the rewards program to the customer at 208.

In some arrangements, the originator financial institution and the beneficiary financial institution share a business relationship sufficient to clear and settle transaction requests without the involvement of the correspondent institutions. In such arrangements, transaction requests and corresponding updates and confirmations may be exchanged between the originator financial institution computing system 120 and the beneficiary financial institution computing system 130 at 214.

Figure 3A:
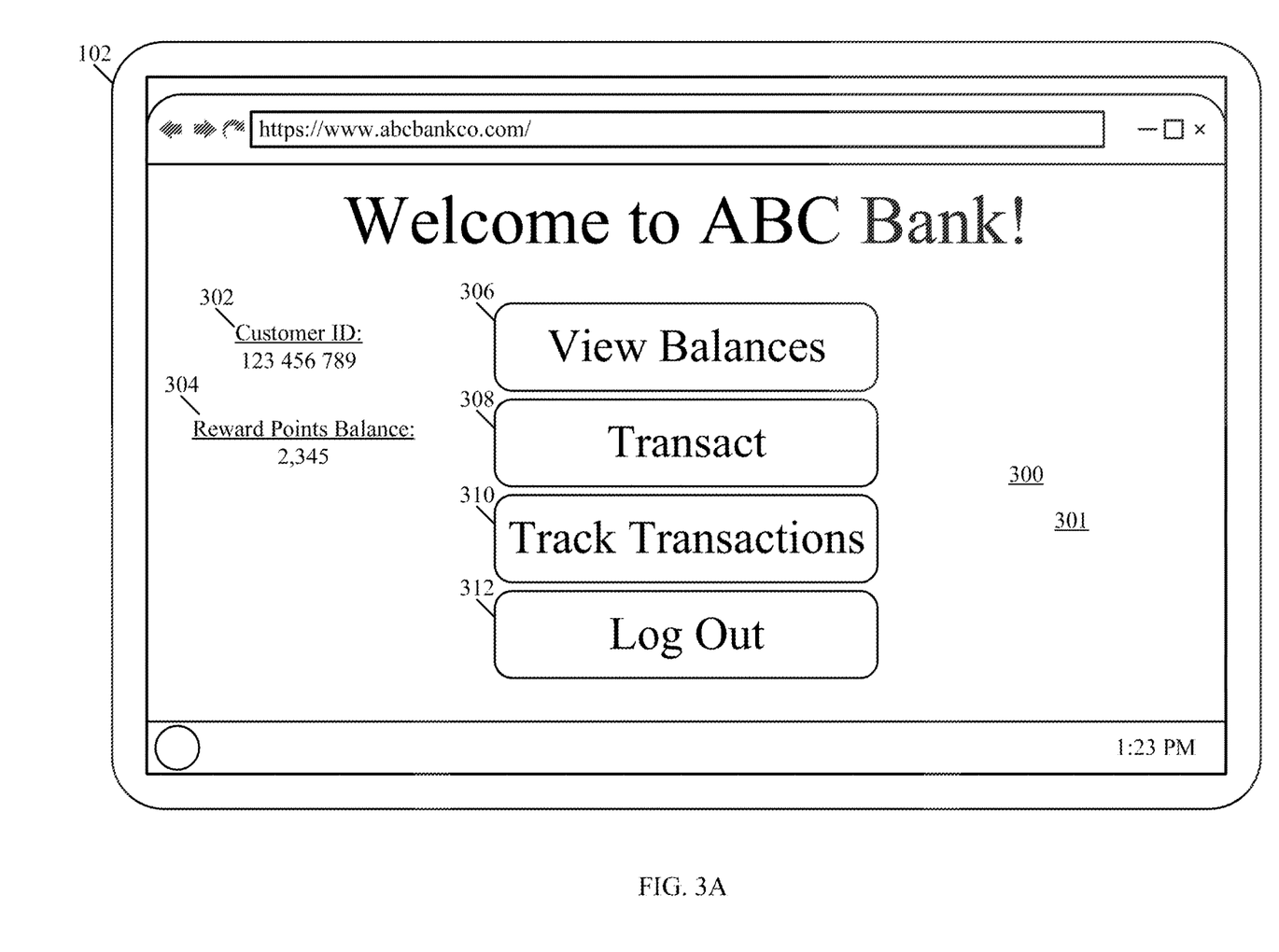
FIGS. 3A and 3B are example arrangements of screens of a graphical user interface.

Referring now to FIG. 3A, an example graphical user interface 300 is shown as a website presented on an example arrangement of a display of the originator computing system 102. In FIG. 3A, the graphical user interface 300 populates a menu page 301 after a customer of the originator financial institution provides authenticated login credentials (e.g., a username and password). The menu page 301 provides the customer with a customer ID 302 (e.g., a nine-digit code specific to the customer) a reward points balance 304, and a plurality of interactive buttons. The plurality of interactive buttons includes a "View Balances" button 306, a "Transact" button 308, a "Track Transactions" button 310, and a "Log Out" button 312. The "View Balances" button 306 is a visual indication of an interactive link to another webpage configured to provide the customer with information relating to account information (e.g., balances, upcoming due dates, payment histories, etc.). The "Transact" button 308 is a visual indication of an interactive link to another webpage where the customer may provide information for the originator financial institution computing system 120 to use to create a transaction request. The "Track Transactions" button 310 is another visual indication of an interactive link to yet another webpage where the customer may view tracking information corresponding to pending and completed transaction requests. Finally, the "Log Out" button 312 is a visual indication of an interactive link configured to log the customer out of the graphical user interface 300.

Figure 3B:
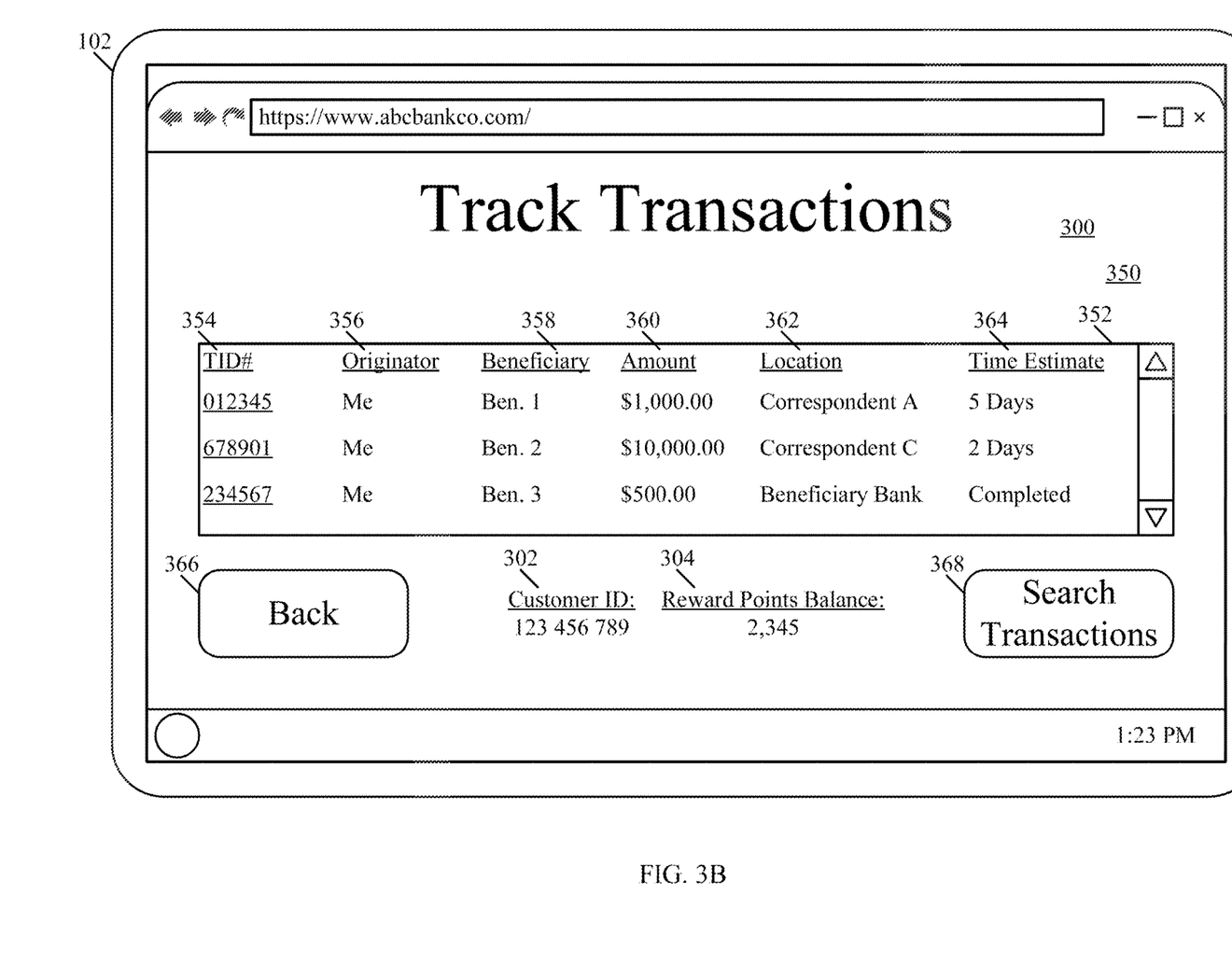

Responsive to a customer selection the "Track Transactions" button 310 of the menu page 301, the graphical user interface 300 refreshes and populates the tracking page 350 shown in FIG. 3B. The tracking page 350 includes a tracking window 352, a "Back" button 366, and a "Search Transactions" button 368. The tracking window 352 provides the customer with information relating to pending and completed transaction requests. In the arrangement shown, the tracking window 352 includes data columns corresponding to transactions IDs 354, originator information 356 (e.g., identity of the originator), beneficiary information 358 (e.g., identity of the beneficiary, beneficiary financial institution, beneficiary financial accounts, etc.), transaction amounts 360, location information 362 (e.g., the correspondent institution who last received the transaction request), and estimated times to settlement 364 (e.g., calculated by the transaction circuit 126 based on tracking information received over the network). In some arrangements, originator information 356, beneficiary information 358, and the transaction amount 360 was provided as financial information by the originator (e.g., via the originator computing system 110). In addition, in some arrangements, the location information 362 is provided by one or more correspondent institutions (e.g., periodically, in real time, upon request, etc.).

The originator financial institution computing system 120 may be configured to generate the transaction IDs 354 to correspond to each transaction request. In some arrangements, the originator financial institution computing system 120 is also configured to compile and organize corresponding transaction tracking information received from one or more correspondent institutions and beneficiary financial institution computing systems. In some such arrangements, information corresponding to transactions listed in the tracking page 350 may be selectable by a user (e.g., the transaction IDs 354 may be presented as user-selectable uniform resource locators ("URLs")), which may cause the graphical user interface 300 to provide the user with detailed information as to the travel history of a given transaction (e.g., identifying each correspondent institution involved in a given transaction, the dates on which the transaction was at each correspondent institution, how long the transaction was at each correspondent institution, etc.). Further, the originator financial institution computing system 120 may be configured to provide the estimated times to settlement 364 for each pending transaction request.

As such, for example, the customer may determine from the tracking window 352 that the transaction request assigned a tracking ID of "012345" was originated by that customer, who provided transaction information identifying "Beneficiary 1" and a payment transaction amount of $1,000.00. In addition, the customer may see that the 012345 transaction request is currently disposed at "Correspondent A" (e.g., a bank along the communication chain between the originator financial institution and the beneficiary financial institution), and that the transaction request may be completed within five days. The customer may opt to select the "012345" URL to view detailed tracking information relating to correspondent institutions involved in that transaction, along with dates on which the transaction was located at each correspondent information, and other related information.

The "Back" button 366 is a visual indication of a link configured to return the graphical user interface 300 to the menu page 301. The "Search Transactions" button 368 is a visual indication of a link to a transaction searching functionality, which may be configured to allow the customer to search the customer database 122 for tracking information by various criteria, for example by beneficiaries, by transaction IDs, transaction request dates, and so on.

Figure 4:
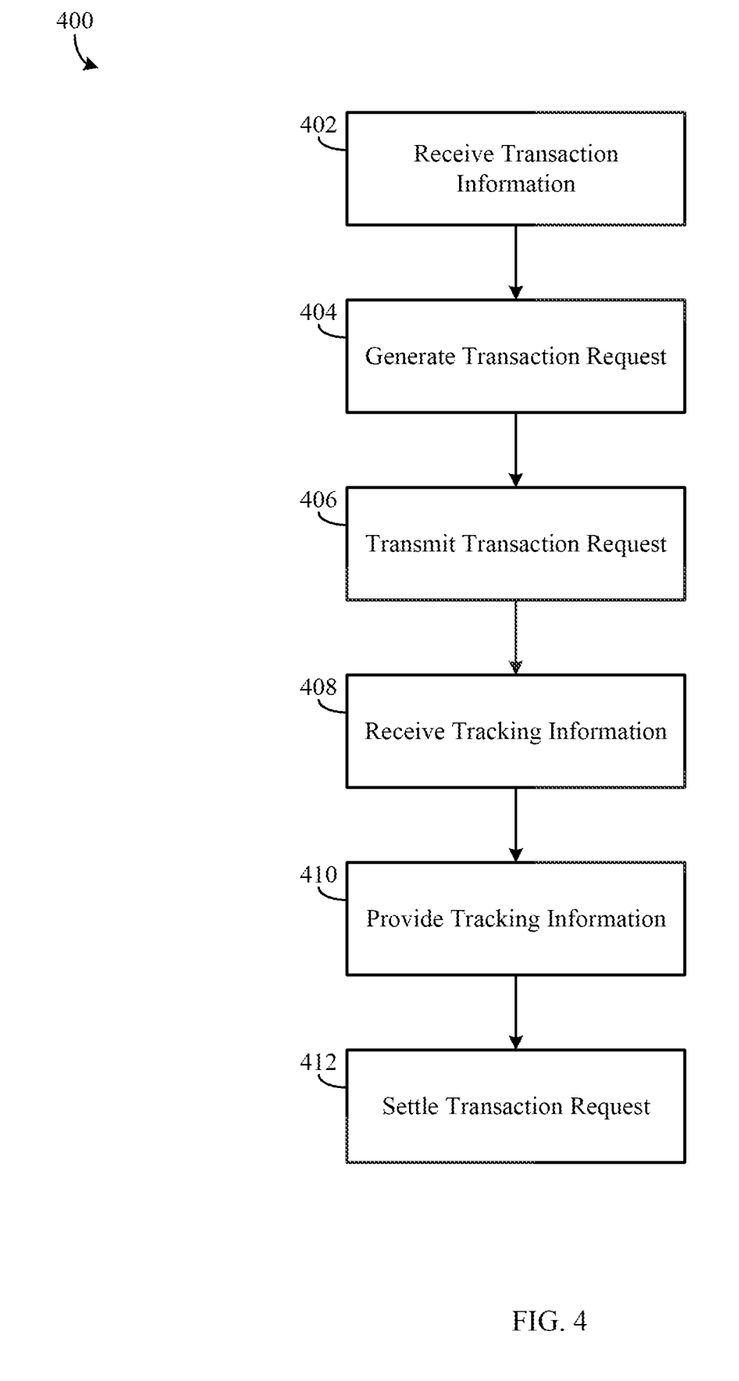
FIG. 4 is a flowchart of a method of generating trackable transaction requests, according to an example embodiment.

Referring now to FIG. 4, a flow chart illustrating a method 400 of tracking payment transactions is shown. In various embodiments, the method 400 may be performed by the originator financial institution computing system 120 of the system 100, as discussed with respect to FIGS. 1 and 2.

At 402, transaction information is received. Transaction information is received over a network (e.g., the network 102) from an originator computing system (e.g., the originator computing system 110). Transaction information may include information sufficient to identify a transaction type (e.g., a transfer of funds), an originator account (e.g., a checking account associated with an originator), and a beneficiary account (e.g., a checking account associated with a beneficiary).

At 404, a transaction request is generated. The transaction request may be generated by a transaction circuit (e.g., the transaction circuit 126), and may include some or all of the transaction information. The transaction information may further include one or more identification codes, which in turn may include a customer ID and/or a transaction ID. Further, the identification codes may include an originator financial institution identifier. The transaction request may also include instructions for correspondent institutions (e.g., correspondent institutions 140), financial network servers (e.g., the financial network server 144), and/or the beneficiary financial institution computing system (e.g., the beneficiary financial institution computing system 130) relating to providing tracking information to the originator financial institution computing system.

At 406, a transaction request is transmitted. The transaction circuit transmits the transaction request over the network via a network interface circuit (e.g., the network interface circuit 124). In some arrangements, the transaction circuit transmits the transaction request to a correspondent institution (e.g., one of the correspondent institutions 140) or a financial network server (e.g., the financial network server 144) for forwarding to the beneficiary financial institution computing system. In other arrangements, the transaction circuit transmits the transaction request to the beneficiary financial institution computing system directly.

At 408, tracking information is received. The transaction circuit receives tracking information relating to the status and/or location of the transaction request from correspondent institutions, financial network servers, or the beneficiary financial institution computing system over the network. In some arrangements, the transaction circuit also receives alerts relating to delays or unfavorable treatment of the transaction request at one or more correspondent institutions. The transaction circuit may also receive a confirmation from the beneficiary financial institution computing system that the transaction request has been cleared and settled at the beneficiary financial institution.

At 410, tracking information is provided to the originator computing system. The transaction circuit may provide tracking information to the originator computing system over the network. In some arrangements, the transaction circuit is configured to provide a graphical user interface that the originator computing system may access over the network. The transaction circuit may populate the graphical user interface with information relating to one or more pending or completed transaction requests, along with any alerts received.

At 412, a transaction request is settled. The transaction circuit may be configured to settle a transaction request after the transaction request is received at the beneficiary financial institution computing system. Settling the transaction request may include debiting a customer account identified in the transaction request and crediting a financial account associated with the originator financial institution and the beneficiary financial institution. Alternatively, settling the transaction request may include crediting a financial account associated with the originator financial institution and a correspondent institution (e.g., where one or more financial networks are used to communicate the transaction request to the beneficiary financial institution computing system).

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium.

Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A provider institution computing system, the system comprising:
a customer database structured to retrievably store information relating to a customer of an originator institution associated with an originator computing system and tracking information relating to a plurality of transaction requests;
a network interface circuit structured to enable the provider institution computing system to exchange information over a network; and
a transaction circuit generating trackable transaction requests across a plurality of institutions, the transaction circuit structured to:
receive, from the originator computing system over the network and on behalf of the customer, information including at least a transaction type and destination account information for a destination account at a destination institution;
generate a first transaction request including a transaction identification code associated with the first transaction request based on the transaction type and the destination account information, the first transaction request further including an originator identifier corresponding to the originator computing system;

transmit the first transaction request to a correspondent institution of the plurality of institutions different from the destination institution over the network and via the network interface circuit;

transmit a tracking request including the originator identifier to one of the plurality of institutions, the tracking request comprising an instruction to provide a tracking update comprising tracking information to the provider institution computing system for the transaction request including the originator identifier;

generate a graphical user interface that includes a list of transaction requests that have transaction identification codes associated with the customer, the list including the tracking information, the transaction identification code, and information regarding an estimated date that the first transaction request will be settled, wherein each of the depicted transaction identification codes includes a user-selectable uniform resource locator;

provide the graphical user interface to a customer computing device of the customer of the originator computing system;

provide, in response to receiving a selection of the transaction identification code in the graphical user interface, information regarding a travel history of the first transaction request; and settle the first transaction request.

2. The provider institution computing system of claim 1, wherein the transaction circuit is further structured to provide an alert to the originator computing system, the alert indicative of one or more adverse treatments of the first transaction request.

3. The provider institution computing system of claim 1, wherein the transaction circuit is further structured to maintain a rewards program regarding transaction requests, wherein the transaction circuit is structured to provide offers of at least one of a discounted service, a free service, or currency in exchange for providing the provider institution computing system with information to generate one or more transaction requests.

4. The provider institution computing system of claim 1, wherein the provider institution computing system is associated with an institution member network, and wherein the transaction circuit is structured to transmit the first transaction request to an institution member network server configured to route the first transaction request to the correspondent institution.

5. The provider institution computing system of claim 1, wherein the transaction circuit is further structured to determine, based on the tracking information, an institution at which the first transaction request is currently disposed, wherein the list of transaction requests includes the institution at which the first transaction request is currently disposed.

6. The provider institution computing system of claim 1, wherein the transaction identification code includes a first portion identifying the originator institution and a second portion identifying the customer.

7. A method of generating trackable transaction requests, the method including:

receiving, by a provider institution computing system and on behalf of a customer of an originator institution, information including at least a transaction type and destination account information for a destination account at a destination institution of a plurality of institutions;

generating, by the provider institution computing system, a first transaction request including at least one tracking instruction and a transaction identification code associated with the first transaction request based on the transaction type and the destination account information, the first transaction request further including an originator identifier corresponding to the originator institution;

transmitting, by the provider institution computing system, the first transaction request to a correspondent institution of the plurality of institutions different from the destination institution;

transmitting, by the provider institution computing system, a tracking request including the originator identifier to one of the plurality of institutions, the tracking request comprising an instruction to provide a tracking update comprising tracking information to the provider institution computing system for the first transaction request including the originator identifier;

generating, by the provider institution computing system, a graphical user interface that includes a list of transaction requests that have transaction identification codes associated with the customer, the list including the tracking information, the transaction identification code, and information regarding an estimated date that the first transaction request will be settled, wherein each of the depicted transaction identification codes includes a user-selectable uniform resource locator;

providing, by the provider institution computing system, the graphical user interface to a customer computing device of the customer;

providing, by the provider institution computing system and in response to receiving a selection of the transaction identification code in the graphical user interface, information regarding a travel history of the first transaction request; and settling, at least partly and by the provider institution computing system, the first transaction request.

8. The method of claim 7, further comprising providing, by the provider institution computing system, an alert corresponding to one or more adverse treatments of the first transaction request to an originator institution computing system associated with the originator institution.

9. A non-transitory computer readable media having computer-executable instructions embodied therein that, when executed by at least one processor of a provider institution computing system, cause the provider institution computing system to perform operations to generate trackable transaction requests, the operations comprising:

receiving, from an originator computing system and on behalf of a customer of an originator institution associated with the originator computing system, information including at least a transaction type and destination account information for a destination account at a destination institution of a plurality of institutions;

generating a first transaction request including tracking at least one instruction and a transaction identification code associated with the first transaction request based on the transaction type and the destination account information, the first transaction request further including an originator identifier corresponding to the originator computing system;

transmitting the first transaction request to a correspondent institution of the plurality of institutions different from the destination institution for forwarding to the destination institution;

transmitting a tracking request including the originator identifier to one of the plurality of institutions, the tracking request comprising an instruction to provide a tracking update comprising tracking information to the provider institution computing system regarding the first transaction request including the originator identifier;

generating a graphical user interface that includes a list of transaction requests that have transaction identification codes associated with the customer, the list including the tracking information, the transaction identification code, and information regarding an estimated date that the first transaction request will be settled, wherein each of the depicted transaction identification codes includes a user-selectable uniform resource locator;

providing the graphical user interface to a customer computing device of the customer of the originator computing system;

providing, in response to receiving a selection of the transaction identification code in the graphical user interface, information regarding a travel history of the first transaction request; and settling the first transaction request.

10. The non-transitory computer readable media of claim 9, wherein a customer identification code corresponding to the originator institution is included in the first transaction request.

11. The non-transitory computer readable media of claim 9, wherein the operations further comprise receiving tracking information indicating that the first transaction request has cleared the correspondent institution while the first transaction request is pending.

* * * * *